3,409,699
OLEFIN ISOMERIZATION PROCESS
Roy T. Mitsche, Island Lake, Ill., assignor to Universal Oil Products Company, Des Plaines, Ill., a corporation of Delaware
No Drawing. Filed Apr. 8, 1966, Ser. No. 541,080
9 Claims. (Cl. 260—683.2)

ABSTRACT OF THE DISCLOSURE

An olefinic hydrocarbon is isomerized utilizing a catalyst comprising at least one active catalytic component, preferably platinum, on an alumina support have dispersed therein less than about 20 weight percent of a finely divided crystalline aluminosilicate.

---

This invention relates to a conversion process for the isomerization of an isomerizable olefinic hydrocarbon into more useful compounds. More specifically, this invention is concerned with a conversion process for the isomerization of an isomerizable olefinic hydrocarbon utilizing a novel catalyst consisting essentially of a support comprising a finely divided crystalline aluminosilicate suspended in an alumina matrix having at least one catalytic ingredient deposited on said support.

I have discovered a catalyst which can be effectively employed in isomerization reactions in which, for example, the double bond of an olefinic hydrocarbon may be shifted to a more centralized position in the chain or the carbon skeleton arrangement of the compound may undergo rearrangement.

It is therefore an object of this invention to provide a process for the isomerization of isomerizable olefinic hydrocarbons utilizing a novel isomerization catalyst.

A specific object of this invention is to provide a novel method and a novel catalyst for isomerizing isomerizable olefinic hydrocarbons to provide the desired isomerized product in high yields without the inducing of other decomposition reactions.

One embodiment of the invention relates to a conversion process which comprises isomerizing an isomerizable olefinic hydrocarbon at a temperature in the range of from about 0° to about 425° C. and a pressure in the range of from about atmospheric to about 200 atmospheres in contact with a catalyst containing a finely divided crystalline aluminosilicate suspended in an alumina matrix and having at least one active catalytic ingredient carried by the matrix.

Other objects and embodiments referring to alternative isomerizable olefinic hydrocarbons and to alternative catalytic compositions of matter will be found in the following further detailed description of the invention.

The process of my invention is applicable to the isomerization of isomerizable olefinic hydrocarbons including, for example, the isomerization of 1-butene to 2-butene, the isomerization of 3-methyl-1-butene to 2-methyl-2-butene. Also, the process of this invention can be utilized to shift the double bond of an olefinic hydrocarbon such as 1-pentene, 1-hexene, 2-hexene and 4-methyl-1-pentene to a more centrally located position so that 2-pentene, 2-hexene, 3-hexene and 4-methyl-2-pentene, respectively, can be obtained. It is not intended to limit this invention to those enumerated olefinic hydrocarbons set out above as it is contemplated that shifting of the double bond to a more centrally located position may be effected in straight or branched chain olefinic hydrocarbons containing up to about 20 carbon atoms per molecule according to the process of the present invention.

As set forth hereinabove, the process of my invention is applicable to the isomerization of olefinic hydrocarbons. Furthermore, these unsaturated hydrocarbons may be derived as selective fractions from various naturally occurring petroleum streams. For example, they may be separated as individual components or, as certain boiling range fractions by selective fractionation and distillation of catalytically cracked gas oil. Thus, the process of this invention may be successfully applied to and utilized for complete conversion of isomerizable olefinic hydrocarbons when these isomerizable olefinic hydrocarbons are present in minor quantities in various gas streams. Thus, the isomerizable olefinic hydrocarbon for use in the process of this invention need not be concentrated. For example, isomerizable olefinic hydrocarbons appear in minor quantities in various refinery gas streams, usually diluted with gases such as hydrogen, nitrogen, methane, ethane, propane, etc. These refinery streams containing minor quantities of isomerizable olefinic hydrocarbons are obtained in petroleum refineries from various refinery installations including thermal cracking units, catalytic cracking units, thermal reforming units, coking units, polymerization units, dehydrogenation units, etc. Such refinery off streams have in the past often been burned for fuel value, since an economical process for the utilization of their hydrocarbon content has not been available. This is particularly true for refinery gas streams known as off-gas streams containing relatively minor quantities of isomerizable olefinic hydrocarbons.

As hereinbefore set forth, the invention is concerned with a conversion process for the isomerization of isomerizable olefinic hydrocarbons, said process being effected in the presence of a catalyst which possesses a high degree of hydrocarbon conversion activity and is particularly effective as an isomerization catalyst for the isomerizable olefinic hydrocarbons hereinabove set forth. The novel catalysts employed in this invetnion consist essentially of a support comprising a finely divided crystalline aluminosilicate dispersed in an alumina matrix and at least one catalytic ingredient deposited on said support. The dual-function catalysts having halogen and a metal possessing hydrogenation-dehydrogenation activity are the preferred catalytic ingredients to be deposited on said support and form a novel catalyst employed in the process of this invention. Especially preferable ingredients are at least one halogen selected from the group consisting of chlorine and fluorine and a metal selected from Group VIII of the Periodic Table (platinum and palladium being the most preferred). One specific catalyst that has been found to be particularly effective contains up to about 0.75 weight percent platinum and up to about 1.0 weight percent chloride, these ingredients being deposited on a support comprising an alumina matrix having less than about 20 weight percent crystalline aluminosilicate dispersed therein.

The crystalline aluminosilicates are composed of $SiO_4$ and $AlO_4$ tetrahedra, a silicon or aluminum atom being centered around four oxygen atoms in the tetrahedra and the oxygens being shared with other surrounding tetrahedra. These aluminosilicates are geometrically arranged to form a pore structure having sufficiently large pore mouths to permit the reactant molecules to pass into said pore structure. Preferably, the aluminosilicates employed in the catalyst support have pore mouths of from about 5 up to about 15 Angstroms in cross-sectional diameter. The aluminosilicates are treated to improve their catalytic activity by techniques such as ion-exchange with suitable cations and thermal treatment. Ordinarily, the aluminosilicates are synthetically prepared in the alkali metal form (usually sodium) and there is one monovalent alkali metal cation associated with each aluminum centered tetrahedra (to maintain electrical neutrality). The aluminosilicates may be ion-exchanged with polyvalent cations such as calcium, magnesium, beryllium, rare earths, etc., to replace a sbustantial amount of the monovalent cations. This causes one polyvalent cation to be associated with more than one aluminum centered tetrahedra and if these tetrahedra are spread sufficiently far apart (due to the presence of silicon centered tetrahedra), areas of local electrical charge will be formed which aid in promoting catalytic reactions. Another treating technique to improve the catalytic activity of the aluminosilicates is to ion-exchange with ammonium ions followed by thermal treatment, preferably above 300° C. to convert the crystalline aluminosilicate to the hydrogen form.

There are numerous types of crystalline aluminosilicates, both synthetic and natural occurring. It is preferable that the pore mouths of the crystalline aluminosilicates have a cross-sectional diameter of from about 5 to about 15 Angstrom units. Among the preferable crystalline aluminosilicates that are suitable are the hydrogen and/or polyvalent forms of faujasite, and mordenite, and especially preferable is the hydrogen form of mordenite. The preparation of these novel catalysts is described in my patent application Ser. No. 517,845, filed Dec. 30, 1965, and the teachings of that application are hereby incorporated into this present application.

The concentration of crystalline aluminosilicate in the alumina matrix is preferably less than about 20 weight percent of the alumina although in some cases greater concentrations may also be suitable. I especially prefer concentrations of aluminosilicate of about 10 weight percent or less. The preferable concentration of Group VIII metal depends to a large extent on the metal. When employing noble metals such as platinum, the concentration on the catalyst is preferably from about 0.05 up to about 5 weight percent whereas in the case of non-noble metals such as nickel, preferable concentration ranges are from about 1 to about 40 weight percent. The halogen content of the catalyst is less critical so that the crystalline aluminosilicate provides a similar type of catalytic activity. Chloride is the preferred halogen and may be present in the catalyst in concentrations up to about 3.0 weight percent although lower values of from about 0.2 up to about 1.0 weight percent are preferred. It is expected that by suitable variation in the type of crystalline aluminosilicate, its form (hydrogen, divalent) and its concentration in the alumina matrix, that it will be possible to eliminate the necessity of any halogen as a catalytic ingredient.

The process of this invention utilizing the catalyst hereinbefore set forth may be effected in any suitable manner and may comprise either a batch or a continuous type operation. The preferred method by which the process of this invention may be effected is a continuous type operation. One particular method is the fixed bed operation in which the isomerizable olefinic hydrocarbon is continuously charged to a reaction zone containing a fixed bed of the desired catalyst, said zone being maintained at the proper operating conditions of temperature and pressure, that is, a temperature in the range of from about 0° to about 425° C. or more, and a pressure including a pressure of from about atmospheric to about 200 atmospheres or more. The catalyst is suitable for either gas phase or liquid phase reactions so that the liquid hourly space velocity (the volume of charge per volume of catalyst per hour) may be maintained in the reaction zone in the range of from about 0.1 to about 20 or more, preferably in the range of from about 0.1 to about 10, or at a gaseous hourly space velocity in the range of from about 100 to about 1500 or more. The reaction zone may comprise an unpacked vessel or coil or may be lined with an adsorbent packing material. The charge passes through the catalyst bed in either an upward or downward flow and the isomerized product is continuously withdrawn, separated from the reactor effluent, and recovered, while any unreacted starting materials may be recycled to form a portion of the feed stock. It is also contemplated within the scope of this invention that reaction gases such as hydrogen, nitrogen, argon, etc., may also be charged to the reaction zone if desired. Another continuous type operation comprises the moving bed type in which the isomerizable olefinic hydrocarbon and the catalyst bed move either concurrently or countercurrently to each other while passing through said reaction zone.

Still another type of operation which may be used is the batch type operation in which a quantity of the isomerizable olefinic hydrocarbon and the catalyst are placed in an appropriate apparatus such as, for example, a rotating or stirred autoclave. The apparatus is then heated to the desired temperature and maintained thereat for a predetermined residence time at the end of which time the flask and contents thereof are cooled to room temperature and the desired reaction product is recovered by conventional means, such as, for example, by washing, drying, fractional distillation, crystallization, etc.

The following examples are given to illustrate the process of the present invention which, however, are not intended to limit the generally broad scope of the present invention in strict accordance therewith.

EXAMPLE I

Aluminum metal, having a purity of 99.99 weight percent is digested in hydrochloric acid to produce a sol having a weight ratio of Al/Cl of about 1.15 and a specific gravity of 1.3450. An aqueous solution containing 28 weight percent HMT is made up and 700 cc. of the HMT solution is added to 700 cc. of the above related sol solution and thoroughly mixed to form a dropping solution. About 10 grams of the hydrogen form of synthetic mordenite in the form of a fine powder is added to the alumina sol and thoroughly dispersed therein. Another portion of the mordenite is chemically analyzed and is found to contain 11.6 weight percent $Al_2O_3$, 87.7 weight percent $SiO_2$ and 0.2 weight percent Na. Still another portion of the mordenite is analyzed for particle size distribution. The results show that 57.6 weight percent of the powder is between 0 and 20 microns in size, 69.5 weight percent of the powder is between 0 and 40 microns in size and 82.1 weight percent of the powder is between 0 and 60 microns in size.

The alumina sol containing the dispersed mordenite is passed through a vibrating dropping head and dropped in discrete particles into a forming oil maintained at 95° C. The rate of vibration and the volumetric flow of alumina sol is set to produce finished spherical particles of about $1/16$ of an inch in diameter. The dropped particles are aged in oil overnight (about 16 hours) separated from the oil and aged in an ammonia solution at 95° C. for about three hours. The aged spherical particles are then water washed to remove neutralization salts and dried. The particles are thereupon calcined at 600° C. for 4 hours in dry air to give a catalyst support having an ABD of between 0.4 and 0.5.

About 350 cc. of the catalyst support is placed in a steam jacketed rotating vessel and 250 cc. of an impregnation solution containing chloroplatinic acid and HCl is added thereto. The impregnation solution contains 131.2 cc. of 10 milligram per milliliter of platinum and 8.4 cc. of concentrated HCl. The vessel is rotated until all the liquid solution is evaporated. The catalyst particles are then oxidized to produce a finished catalyst containing about 0.75 weight percent platinum, about 0.75 weight percent chloride and about 5 weight percent mordenite type aluminosilicate. This catalyst was designated as catalyst "A."

EXAMPLE II

A second batch of catalyst is made exactly the same as described in Example I except 20 grams of synthetic mordenite is used instead of 10 grams. This results in a finished catalyst being produced containing about 0.75 weight percent platinum, about 0.75 weight percent chloride and 10 weight percent mordenite. This catalyst is designated as catalyst "B."

EXAMPLE III

The catalyst designated as catalyst "A" prepared according to Example I above is utilized in an isomerization reaction, 50 cc. of the finished catalyst being placed in an appropriate continuous isomerization apparatus. In the experiment, 1-butene is charged to the isomerization zone. The reactor is maintained at about 800 p.s.i.g. and 140° C. Substantial conversion of the 1-butene to cis- and trans-2-butene is obtained as is evidenced by gas-liquid chromatography.

EXAMPLE IV

A second portion of the catalyst prepared according to Example I and desigated as catalyst "A" is again utilized in an appropriate continuous isomerization apparatus. In the experiment, 50 cc. of the finished catalyst is placed in the isomerization reaction zone and 1-pentene is charged to said reaction zone. The reactor is maintained at about 1000 p.s.i.g. and about 180° C. Substantial conversion of the 1-pentene to 2-pentene is obtained as is evidenced by gas-liquid chromatography.

EXAMPLE V

The catalyst prepared according to Example II and designated as catalyst "B" is utilized in an appropriate continuous isomerization apparatus to determine the isomerization activity of said catalyst. In the experiment, 50 cc. of catalyst is placed in the isomerization reaction zone and 1-hexene is charged to said reaction zone. The reactor is maintained at about 1000 p.s.i.g. and a temperature of about 150° C. Gas-liquid chromatographic analyses of the product stream indicate that substantial conversion occurs with the major product being 2-hexene.

EXAMPLE VI

The catalyst prepared according to Example II and designated as catalyst "B" is utilized in an appropriate isomerization apparatus to determine the isomerization activity of said catalyst. In the experiment, 50 cc. of finished catalyst is placed in the isomerization reaction zone and 3-methyl-1-butene is charged thereto. The reactor is maintained at about 1000 p.s.i.g. and about 180° C. Substantial conversion of the 3-methyl-1-butene to 2-methyl-2-butene is obtained as is evidenced by gas-liquid chromatography.

I claim as my invention:

1. A process for isomerizing an isomerizable olefinic hydrocarbon which comprises reacting said hydrocarbon at a temperature in the range of from about 0° to about 425° C. and a pressure in the range of from about atmospheric to about 200 atmospheres in contact with a catalyst comprising a platinum group component on a solid support consisting essentially of an alumina matrix having dispersed therein less than about 20 weight percent of a finely divided crystalline aluminosilicate selected from the group consisting of faujasite and mordenite.

2. The process of claim 1 further characterized in that the crystalline aluminosilicate is in the hydrogen form.

3. The process of claim 2 further characterized in that the crystalline aluminosilicate is mordenite and the metal is selected from the group consisting of platinum and palladium.

4. The process of claim 3 further characterized in that the metal is platinum and the concentration of platinum on the catalyst is from about 0.05 to about 5.0 percent by weight.

5. The process of claim 4 further characterized in that said isomerizable olefinic hydrocarbon is 1-butene.

6. The process of claim 4 further characterized in that said isomerizable olefinic hydrocarbon is 1-pentene.

7. The process of claim 4 further characterized in that said isomerizable olefinic hydrocarbon is 1-hexene.

8. The process of claim 4 further characterized in that said isomerizable olefinic hydrocarbon is 3-methyl-1-butene.

9. The process of claim 4 further characterized in that the catalyst contains from about 0.2% to about 3.0% by weight of at least one halogen selected from the group consisting of chlorine and fluorine.

References Cited

UNITED STATES PATENTS

| | | | |
|---|---|---|---|
| 3,140,253 | 7/1964 | Plank et al. | 208—120 |
| 3,214,487 | 10/1965 | Mattox | 260—683.2 |
| 3,248,448 | 4/1966 | Goble et al. | 260—683.2 |
| 3,248,450 | 4/1966 | Goble | 260—683.2 |

DELBERT E. GANTZ, *Primary Examiner.*

G. E. SCHMITKONS, *Assistant Examiner.*